United States Patent [19]
David et al.

[11] Patent Number: 5,496,528
[45] Date of Patent: Mar. 5, 1996

[54] RARE EARTH OXIDES

[75] Inventors: Claire David, Paris; Francoise Seon, Montreuil, both of France

[73] Assignee: Rhone-Poulenc Chimie, Courbevoie, France

[21] Appl. No.: 206,224

[22] Filed: Mar. 7, 1994

Related U.S. Application Data

[63] Continuation of Ser. No. 9,354, Jan. 26, 1993, abandoned, which is a continuation of Ser. No. 545,150, Jun. 28, 1990, abandoned, which is a continuation of Ser. No. 208,037, Jun. 17, 1988, abandoned.

[30] Foreign Application Priority Data

Jun. 17, 1987 [FR] France ................... 87 8440

[51] Int. Cl.$^6$ ................ C01F 17/00; B01J 23/00
[52] U.S. Cl. ................ 423/263; 502/302; 502/303
[58] Field of Search ................ 423/263, 592, 423/593, 21.1; 501/152; 502/302, 303, 304, 355

[56] References Cited

U.S. PATENT DOCUMENTS

| | | | |
|---|---|---|---|
| 3,914,389 | 10/1975 | Haadce | 423/263 |
| 3,950,478 | 4/1976 | Kenworthy et al. | 423/625 |
| 4,605,631 | 8/1986 | Rossi | 501/152 |
| 4,661,330 | 4/1987 | Chane-Ching et al. | 423/263 |
| 4,663,137 | 5/1987 | Chane-Ching et al. | 423/263 |
| 4,714,694 | 12/1987 | Wan et al. | 502/304 |
| 4,738,946 | 4/1988 | Yamashita et al. | 502/302 |
| 4,752,459 | 6/1988 | Pepper | 423/338 |
| 4,755,492 | 7/1988 | Greskovich et al. | 501/152 |
| 4,761,390 | 8/1988 | Hartnett et al. | 501/152 |
| 4,857,296 | 8/1989 | Brunelle et al. | 423/263 |
| 4,859,432 | 8/1989 | David et al. | 423/263 |
| 4,868,150 | 9/1989 | Spooner et al. | 502/302 |
| 4,940,685 | 7/1990 | Sauvion et al. | 502/304 |
| 4,999,180 | 3/1991 | Gourlaouen et al. | 423/592 |

FOREIGN PATENT DOCUMENTS

| | | | |
|---|---|---|---|
| 1232937 | 10/1960 | France | |
| 60-65706 | 4/1985 | Japan | 423/263 |
| 833525 | 5/1981 | U.S.S.R. | 423/263 |

OTHER PUBLICATIONS

Alvero, R. et al, "Lanthanide Oxides: Preparation and Aging" J. Chem. Soc. Dalton Trans. (1), pp. 87–91, 1984, no month.

Alvero, R. et al, "Effect of the Precursor Salt on the Reactivity of $La_2O_3$", J. Less–Common Metals, 112 (no month) (1985) pp. 347–354.

S. Bernal et al., "Analysis of Some Aspects of the Catalytic Behaviour Lanthanide Oxides", *Jounral Of The Less–Common Metals*, pp. 145–150 (1983), no month.

S. Brunauer et al., "Adsorption of Gases in Multimolecular Layers", *Journal Of The American Chemical Society*, vol. 60, No. 2, pp. 309–319 (Feb., 1938).

Final Report entitled, "Processing Studies For Optically Transparent $LA_2O_3$–Doped $Y_2O_3$", Office of Naval Research, Contract No. N00014–82–C–0452, W. H. Rhodes et al, GTE Laboratories Incorporated, Jul. 31, 1986.

Chemical Abstracts, vol. 74, p. 470, #60296p, (no month) (1971), Columbus, Ohio.

*Primary Examiner*—Steven Bos
*Attorney, Agent, or Firm*—Burns, Doane, Swecker & Mathis

[57] ABSTRACT

Novel rare earth oxides having a large specific surface of at least 40 m$^2$/g, well adapted for catalysis, are prepared (i) by reacting at least one rare earth salt with a strong base in the presence of carboxylate ions, or by reacting at least one rare earth carboxylate with a strong base, to produce a true rare earth hydroxide, (ii) separating the precipitate thus produced, and then (iii) washing and (iv) calcining such precipitate.

26 Claims, 1 Drawing Sheet

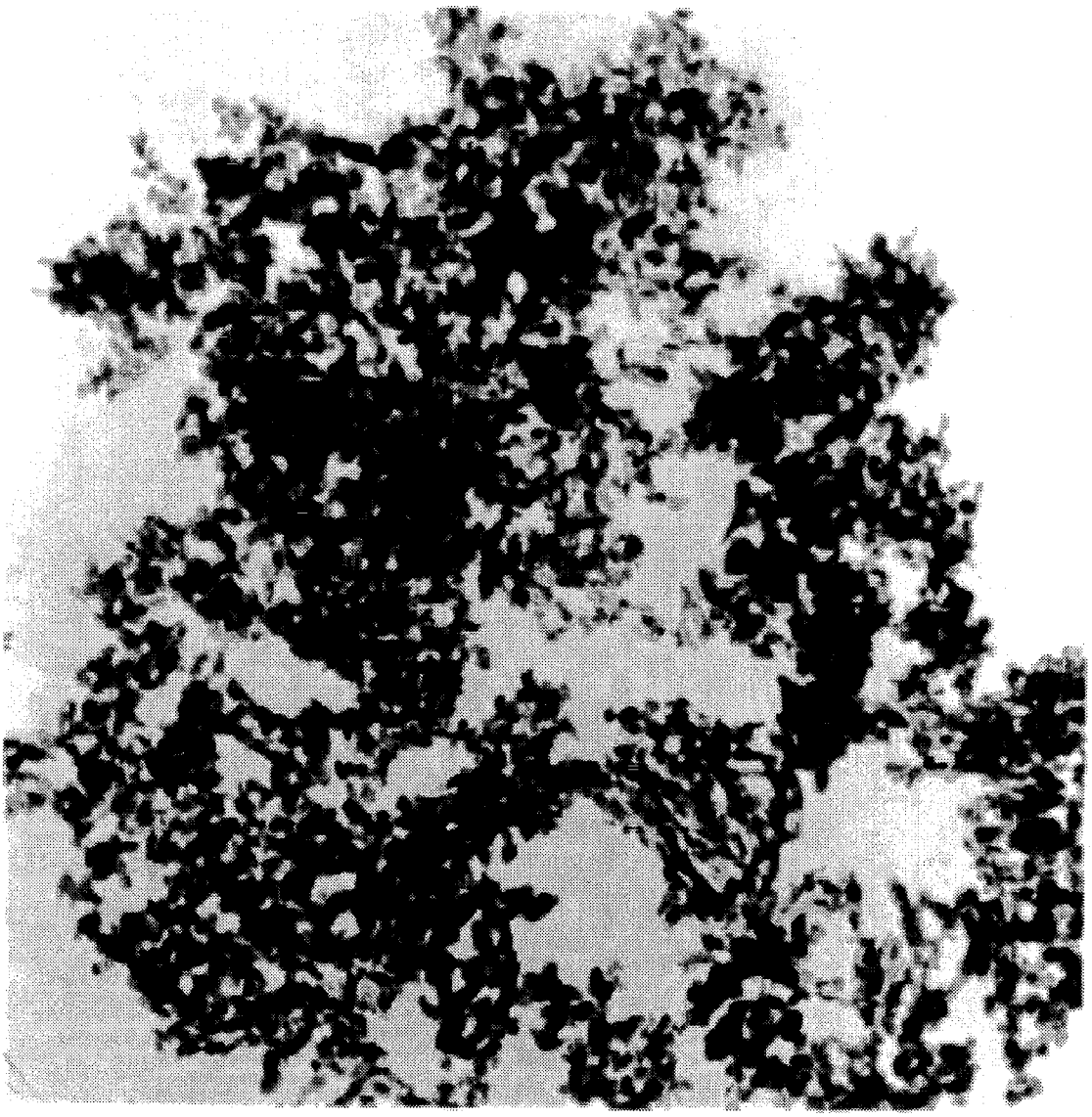

RARE EARTH OXIDES

This application is a continuation of application Ser. No. 08/009,354, filed Jan. 26, 1993 now abandoned, which is a continuation of application Ser. No. 07/545,150, filed Jun. 28, 1990 now abandoned, which is a continuation of application Ser. No. 07/208,037, filed Jun. 17, 1988 now abandoned.

BACKGROUND OF THE INVENTION

1. Field of the Invention

The present invention relates to the production of novel rare earth oxides, and, more especially, to the production of novel rare earth oxides having large specific surfaces.

In the description which follows, the specific surface is defined as the B.E.T. specific surface determined by the BRUNAUER—EMMETT—TELLER method, described in *Journal of the American Chemical Society*, 60, 309 (1938).

By the term "rare earths" are intended the metallic elements such as yttrium, lanthanum, praseodymium, neodymium, samarium, europium, gadolinium, terbium, dysprosium, holmium, erbium, thulium, ytterbium and lutecium.

2. Description of the Prior Art

For numerous applications, such as, for example, in the field of catalysis, it is desirable to employ rare earth oxides having a large specific surface.

The conventional processes for producing rare earth oxides by the calcination of a salt of a rare earth, in the form of a carbonate, a hydroxide or an oxalate, at an elevated temperature, provide rare earth oxides having a relatively small specific surface. Compare S. Bernal et al, *Journal of Less-Common Metals*, 94, 145–150 (1983), describing rare earth oxides having a specific surface ranging from 15.1 to 40.5 $m^2/g$ after calcination at 500° C.

In published French Application No. 2,584,701, a neodymium oxide obtained by the calcination of a neodymium hydroxynitrate is described. However, the resulting oxide, while having an increased specific surface relative to the conventional products, has a specific surface ranging from 5 to 30 $m^2/g$ after calcination at a temperature of from 700° to 900° C.

SUMMARY OF THE INVENTION

Accordingly, a major object of the present invention is the production of novel trivalent rare earth oxides having large specific surfaces.

Briefly, the present invention features the production of novel rare earth oxides by reacting at least one salt of a rare earth with a strong base in the presence of carboxylate ions, or by reacting a rare earth carboxylate with a strong base, to produce a true rare earth hydroxide, and then separating the precipitate thus obtained, and washing and heat treating same.

BRIEF DESCRIPTION OF THE DRAWING

The FIGURE shows a transmission electron micrograph of neodymium oxide produced according to the present invention.

DETAILED DESCRIPTION OF THE PREFERRED EMBODIMENTS OF THE INVENTION

More particularly according to the present invention, a true rare earth hydroxide, $RE(OH)_3$, is precipitated. Such rare earth hydroxide may contain a residual amount of bonded or adsorbed anions emanating from the initial rare earth salt, but it is important that this amount be as low as possible. However, a minimum amount of less than approximately 7%, expressed in mole %, of anions relative to the number of moles of $OH^-$, is tolerated.

In the first stage of the process of the invention, the true rare earth hydroxide is produced.

In one embodiment of the invention, the precipitation is effected by reacting at least one rare earth salt with a base in the presence of carboxylate ions, which may be introduced in the acid form or in the form of a salt of an alkali metal or ammonium.

Hereinafter, for purposes of convenience, all of the sources of the carboxylate ions, whether in the acid or salt form, will be designated as "carboxylic acids".

The at least one rare earth salt is mixed with the carboxylic acid, and the mixture is reacted with a base.

The rare earth salt according to this invention may be any rare earth salt that is soluble under the conditions of the subject process.

It is also possible to use a mixture of rare earth salts or a mixture of salts of different rare earths.

The most convenient rare earth oxide is the sesquioxide and, therefore, a trivalent rare earth salt is used most frequently.

Exemplary of suitable rare earth salts are the nitrates, chlorides and/or the sulfates, in the solid state or in an aqueous solution.

A salt or salts of rare earths in the form of the nitrate are preferred.

The rare earth salt is selected such as not to contain impurities which may be transferred to the final product. It may be advantageous to use a rare earth salt having a degree of purity greater than 99%.

The concentration of the solution of the rare earth salt is not a critical factor according to the invention and it may vary over wide limits; a concentration, expressed in metal cations of from 0.1 to 3 moles per liter, is preferred.

As the source of the carboxylate ions, any carboxylic acid soluble under the conditions of the invention may be used and in particular the aliphatic, cycloaliphatic, or aromatic carboxylic acids, or mixtures thereof. Preferably, linear or branched chain aliphatic carboxylic acids having from 1 to 20 carbon atoms are used.

The following carboxylic acids are representative: formic acid, acetic acid, propionic acid, benzoic acid. Acetic acid is the preferred.

The proportion of the carboxylic acid to be used relative to the rare earth salt is not critical. The molar ratio of the acid to the trivalent rare earth salt, expressed as the metallic cation thereof, may thus range from 0.1 to 10 and preferably from 0.1 to 5.

Consistent herewith, the mixture of the aqueous solution of the rare earth salt and the carboxylic acid is reacted with a base.

The base is advantageously an aqueous solution of a strong base, such as, for example, an aqueous solution of sodium hydroxide.

The normality of the basic solution is not a critical factor according to the invention; it may vary over wide limits, for example, from 0.1 to 11N, and it is preferred to use a solution having a concentration of from 1 to 5N.

The proportion of the base to the rare earth salt is such that the molar ratio $(OH^-)/(RE)$, expressed as the metallic cation, is greater than or equal to 3.0.

Preferably, it is greater than or equal to 3.0 and less than or equal to 10. The upper limit is not critical, but, for economic reasons, it should not be exceeded.

A final concentration of the reaction medium in the rare earth, expressed as the metallic cation, is selected as to be from 0.2 to 1 mole/liter and preferably around 0.5 mole/liter.

The mixing of the different reagents, in the aforesaid amounts, is carried out at a temperature ranging from ambient to the reflux temperature of the reaction mixture, preferably from 80° C. to the reflux temperature of the reaction mixture.

The duration of the reaction is not critical. It may range from 1h to 8 h, preferably from 2 to 5 h.

The mixing of the aforementioned reagents may be conducted in several ways. For example, the mixing of the aqueous solution of at least one rare earth salt and a carboxylic acid with the basic solution may be carried out simultaneously, under agitation, or the base may be added continuously, or in one batch, to said mixture, or conversely.

Another embodiment of the invention entails precipitating a true rare earth hydroxide by reacting at least one rare earth carboxylate with a base.

Exemplary of the rare earth carboxylate, any rare earth carboxylate soluble under the conditions of the invention may be used, and particularly those derived from aliphatic, cycloaliphatic, or aromatic carboxylic acids, or mixtures thereof. Preferably, linear or branched chain aliphatic carboxylic acids having from 1 to 20 carbon atoms are used.

Exemplary of the rare earth carboxylates, the acetate, 2-ethylhexanoate, neodecanoate, and stearate of a trivalent rare earth are representative.

As the rare earth carboxylates are typically in the solid state, they are preferably added to an aqueous solution of the base.

The proportions of the reagents and the process conditions are identical to those described above.

The precipitate of the hydroxide of the rare earth or earths may be separated from the reaction medium by conventional solid/liquid separation techniques: filtration, decantation, centrifugation or drying.

This separation is generally carried out at ambient temperature.

The precipitate is then subjected to a washing operation.

The washing is preferably carried out with water. Preferably, deionized or distilled water is used.

It is also possible to use a slightly acid solution, for example acidified with nitric acid with a concentration that may be lower, for example, than 1%.

Such a washing may replace or succeed the washing with water, or conversely.

In the case in which a rare earth carboxylate corresponding to the cation of the base is in the insoluble form, together with the hydroxide of the rare earth, it may be advantageous to carry out the wash by means of an organic solvent solubilizing the rare earth carboxylate. Exemplary such solvents are methanol, ethanol, n-propanol, isopropanol and aldehydes or ketones, for example acetone.

One or more washes are carried out, most frequently one or two washes.

A preferred embodiment of the washing operation entails placing the separated precipitate in suspension in water in an amount, for example, of 100 to 300 g/l.

After such washing, the precipitate is separated by the aforementioned conventional methods.

The free water content of the precipitate separated typically ranges from 20% to 80% and more generally from 20% to 50%.

The product obtained after separation and washing may subsequently be dried in air or under a reduced pressure on the order of $10^{-7}$ to 100 mm mercury (133.3322 Pa to 13 332.2 Pa). The drying temperature may range from ambient to 100° C. and the duration of the drying is not critical and may range from 2 to 48 h, preferably 10 to 24 h.

In the last stage of the process of the invention, the dried product is calcined at a temperature of from 300° to 800° C., but preferably from 350° to 600° C. It is carried out over approximately 30 min to 24 h and preferably from 4 to 8 h.

The lower limit of the temperature range is not critical and may be lowered.

In contrast, there is no reason to raise the upper limit of the calcining temperature, as a decrease in the specific surface of the rare earth oxide obtained is observed.

Conducting the process of the invention as described above results in particulate(s) of a rare earth oxide, the rare earth oxide being selected from the group consisting of yttrium oxide, lanthanum oxide, praseodymium oxide, neodymium oxide, samarium oxide, europium oxide, gadolinium oxide, terbium oxide, dysprosium oxide, holmium oxide, erbium oxide, lutecium oxide, thulium oxide, and ytterbium oxide, the rare earth oxide, having a large specific surface.

Thus, this invention features novel trivalent rare earth oxides having a specific surface of at least 40 $m^2/g$ or at least 44 $m^2/g$, measured after calcination at a temperature of from 350° to 600° C., a pore volume of at least 0.2 $cm^3/g$ and an average pore diameter larger than 50 Å.

Consistent herewith, the specific surfaces expressed are measured on a product subjected to calcination for at least 2 h at the given temperature.

A first characteristic of the rare earth oxides of the invention is that they have a large specific surface.

The preferred rare earth oxides according to the invention have a specific surface of from 70 to 110 $m^2/g$ measured after calcination at a temperature of from 400° to 450° C.

Another characteristic of the rare earth oxides according to the invention is that they have a relatively stable specific surface over a temperature range from 400° to 600° C.

The rare earth oxides of the invention have a specific surface on the order of 40 to 70 $m^2/g$ measured after calcination at 600° C. Such specific surface decreases to approximately 30 $m^2/g$ when the material is subjected to a temperature increase of 400° to 600° C.

Another characteristic of the rare earth oxides of the invention is that they have a high porosity.

The pore volume of the rare earth oxides according to the invention ranges from 0.2 to 0.9 $cm^3/g$.

The size of the pores ranges from 30 to 600 Å. The mean diameter ($d_{50}$) of the pores ranges from 50 to 400 Å.

The mean diameter is defined as a diameter such that all of the pores less than this diameter constitute 50% of the total pore volume ($v_p$).

Examination by scanning electron microscopy evidences that the rare earth oxides are very fine grains on the order of 1 to 5 μm, with the presence of coarse agglomerates on the order of 20 to 50 μm.

Examination by transmission electron microscopy evidences crystals of the acicular form.

The dimensions of the needles ranges from 100 to 1,000 Å, most typically around 500 Å.

The attached Figure of Drawing is a transmission electron micrograph (enlargement G=54,000), which reveals the morphology of the neodymium oxide in the form of needles; the oxide has been subjected to calcination at 600° C.

Diffraction X-ray analysis evidences that the rare earth oxide obtained after calcination at 400° C. is a rare earth oxide having a crystal size of 40 to 100 Å.

According to the invention, a rare earth oxide containing a residual amount of an alkaline cation, corresponding to the cation of the base used in the preparation of the oxide, is obtained. The residual alkaline cation content generally constitutes at most 0.5%, expressed in % by weight of the metal cation relative to the rare earth oxide.

In order to further illustrate the present invention and the advantages thereof, the following specific examples are given, it being understood that same are intended only as illustrative and in nowise limitative. In said examples to follow, all parts and percentages are given by weight.

EXAMPLE 1

Yttrium oxide was produced in a reactor having a useful volume of 5,000 cm$^3$, equipped with a double jacket in which water controlled at the temperature desired was circulating and provided with an agitator and a system for the introduction of reagents.

At 20° C., 1,000 cm$^3$ of a 1.5N aqueous solution of sodium hydroxide were introduced and heated to 95° C.

Subsequently, over 20 min a mixture consisting of 286 cm$^3$ of an aqueous solution of yttrium nitrate, at a concentration of 1.4 moles/liter, and 12 cm$^3$ of concentrated 17.5N acetic acid were added.

The addition was carried out at 95° C. and under agitation.

After the addition of said mixture, the reaction temperature was maintained for 3 h.

The reaction mixture, consisting of an aqueous suspension of yttrium hydroxide, was permitted to cool to ambient temperature.

The yttrium hydroxide precipitate was separated by filtration on a Buchner filter (porosity No. 3).

The precipitate was washed three times with a slightly acid 0.1% nitric acid solution; the precipitate recovered was suspended, in a proportion of 100 g of the precipitate per liter of the wash solution.

After filtering, the recovered precipitate was dried in an oven at 80° C. for 24 h.

66.6 g of a product containing 45 g $Y_2O_3$ were obtained, this corresponded to a reaction yield of 100%.

The dried product was placed in an alumina boat and calcined in a muffle furnace for 6 h at 400° C.

X-ray diffraction analysis showed a crystallite size of 50 Å.

By the BET method, a specific surface of 108 m$^2$/g and a pore volume of 0.78 cm$^3$/g were determined.

X-ray fluorescent sodium analysis showed a residual sodium content of 0.16%.

EXAMPLE 2

The procedure of Example 1 was repeated, except that the calcining temperature was 600° C. instead of 400° C.

A yttrium oxide having a specific surface of 65 m$^2$/g and a crystallite size of 100 Å was produced.

EXAMPLE 3

In an apparatus as described in Example 1, at 20° C., 1,000 cm$^3$ of a 1.5N aqueous solution of sodium hydroxide were introduced and heated to 95° C.

Over 20 min and under agitation, 170 cm$^3$ of an aqueous solution of neodymium nitrate, at a concentration of 2.9 moles/liter, and 15.7 g of 17.5N concentrated acetic acid were added.

Following the addition of said mixture, the temperature of 95° C. was maintained for 3 h.

The reaction mixture, consisting of an aqueous suspension of neodymium hydroxide, was permitted to cool to ambient temperature.

The precipitate was separated on a Buchner filter (porosity No. 3).

The washing operation was carried out as in Example 1.

After filtration, the recovered solids were dried for 24 h at 100° C., then calcined for 6 h at 400° C.

A neodymium oxide was produced having a specific surface of 79 m$^2$/g and containing 0.15% residual sodium.

EXAMPLE 4

The procedure of Example 3 was repeated, except that the calcination was carried out at 600° C. instead of 400° C.

A neodymium oxide having a specific surface of 45 m$^2$/g was produced.

EXAMPLE 5

Neodymium oxide was produced according to the procedure of Example 3, but the 150 g of concentrated acetic acid were replaced by 15.7 g concentrated formic acid.

The BET analysis of the neodymium oxide produced showed a specific surface on the order of 70 m$^2$/g.

The residual sodium content was 0.12%.

EXAMPLE 6

In an apparatus as described in Example 1, at 20° C., 1,720 cm$^3$ of a 1.5N aqueous solution of sodium hydroxide were introduced and heated to 95° C.

Over 20 min and under agitation, 284 cm$^3$ of a 2.6 moles/liter aqueous solution of lanthanum nitrate and 21.6 g 17.5N concentrated acetic acid were added.

Following the addition of this mixture, the temperature was maintained at 95° C. for 3 h.

The reaction mixture, consisting of an aqueous suspension of lanthanum hydroxide, was permitted to cool to ambient temperature.

The precipitate was separated on a Buchner filter (porosity No. 3).

The washing operation was carried out as in Example 1.

After filtration, the solids recovered were dried for 24 h at 100° C., then calcined for 6 h at 400° C.

A lanthanum oxide having a specific surface of 72 m$^2$/g was produced.

EXAMPLE 7

The procedure of Example 6 was repeated, except that the calcination was carried out at 600° C. instead of 400° C.

A lanthanum oxide having a specific surface of 44 m$^2$/g was produced.

EXAMPLE 8

In this example, a yttrium hydroxide was precipitated by reacting a base with yttrium acetate.

The yttrium acetate was prepared according to the operation described in the encyclopedia, GMELIN HANDBOOK— Rare earth, Vol. D 5, p. 34.

In an apparatus as described in Example 1, at 20° C., 500 cm$^3$ of a 3N aqueous solution of sodium hydroxide were introduced and heated to 95° C.

Over 30 min, under agitation, 90 g yttrium acetate were added in the solid state.

After the addition of the acetate, the temperature of 95° C. was maintained for 4 h.

The reaction mixture, consisting of an aqueous suspension of yttrium hydroxide, was permitted to cool to ambient temperature.

The yttrium hydroxide precipitate was separated by filtration on a Buchner filter (porosity No. 3).

Washing was performed as in Example 1.

After filtration, the solids collected were dried in an oven at 100° C. for 24 h.

The dried product was placed in an alumina boat and calcined in a muffle furnace for 6 h at 400° C.

88.3 g of a product containing 59.2 g Y$_2$O$_3$ were obtained, which corresponded to a reaction yield of 95%.

Porosimetric BET analysis showed a specific surface of 110 m$^2$/g.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Particulates of a calcined trivalent rare earth oxide, the rare earth oxide being selected from the group consisting of yttrium oxide, lanthanum oxide, praseodymium oxide, neodymium oxide, samarium oxide, europium oxide, gadolinium oxide, terbium oxide, dysprosium oxide, holmium oxide, erbium oxide, lutecium oxide and thulium oxide, the rare earth oxide having a specific surface of at least 44 m$^2$/g measured after calcination for at least two hours at a temperature of from 350° to 600° C., a pore volume of at least 0.2 cm$^3$/g, and a mean pore diameter of greater than 50 Å.

2. The particulate rare earth oxide as defined by claim 1, having a specific surface ranging from 70 to 110 m$^2$/g, measured after calcination at a temperature of from 400° to 450° C.

3. The particulate rare earth oxide as defined by claim 1, the specific surface of which is stable so as to be in the range of 44 to 108 m$^2$/g over a temperature range of from 400° to 600° C.

4. The particulate rare earth oxide as defined by claim 1, having a pore volume of from 0.2 to 0.9 cm$^3$/g.

5. The particulate rare earth oxide as defined by claim 1, having a specific surface ranging from 44 to 70 m$^2$/g measured after calcination at a temperature of 600° C.

6. The particulate rare earth oxide as defined in claim 1, the pores having diameters ranging from 30 to 600 Å.

7. The particulate rare earth oxide as defined by claim 6, having a mean pore diameter of from greater 50 to 400 Å.

8. The particulate rare earth oxide as defined by claim 1, comprising grains of a size of from 1 to 5 μm and agglomerates of a size of from 20 to 50 μm.

9. The particulate rare earth oxide as defined by claim 1, comprising acicular crystalline needles.

10. The particulate rare earth oxide as defined by claim 9, said needles having dimensions ranging from 100 to 1000 Å.

11. The particulate rare earth oxide as defined in claim 1, comprising up to 0.5% by weight of residual alkaline cation corresponding to a cation of a base used in preparation of the rare earth oxide.

12. The particulate rare earth oxide as defined by claim 1, the specific surface being greater than 45 m$^2$/g.

13. Particulates consisting essentially of a calcined trivalent rare earth oxide, the rare earth oxide being selected from the group consisting of yttrium oxide, lanthanum oxide, praseodymium oxide, neodymium oxide, samarium oxide, europium oxide, gadolinium oxide, terbium oxide, dysprosium oxide, holmium oxide, erbium oxide, lutecium oxide and thulium oxide, the rare earth oxide having a specific surface of at least 44 m$^2$/g, measured after calcination for at least two hours at a temperature of from 350° to 600° C., a pore volume of at least 0.2 cm$^3$/g and a mean pore diameter of greater than 50 Å.

14. The particulate rare earth oxide as defined by claim 13, the specific surface ranging from 70 to 110 m$^2$/g, measured after calcination at a temperature of from 400° to 450° C.

15. The particulate rare earth oxide as defined by claim 13, the specific surface of which is stable so as to be in the range of 44 to 108 m$^2$/g over a temperature range of from 400° to 600° C.

16. The particulate rare earth oxide as defined by claim 13, having a pore volume of from 0.2 to 0.9 cm$^3$/g.

17. The particulate rare earth oxide as defined by claim 13, having a specific surface ranging from 44 to 70 m$^2$/g, measured after calcination at a temperature of 600° C.

18. The particulate rare earth oxide as defined in claim 13, the pores having diameters ranging from 30 to 600 Å.

19. The particulate rare earth oxide as defined by claim 13, the mean diameter of the pores ranging from greater than 50 to 400 Å.

20. The particulate rare earth oxide as defined by claim 13, comprising grains of a size of from 1 to 5 μm and agglomerates of a size of from 20 to 50 μm.

21. The particulate rare earth oxide as defined by claim 13, comprising acicular crystalline needles.

22. The particulate rare earth oxide as defined by claim 21, said needles having dimensions ranging from 100 to 1000 Å.

23. The particulate rare earth oxide as defined by claim 13, comprising up to 0.5% by weight of residual alkaline cation.

24. The particulate rare earth oxide as defined by claim 13, the specific surface being greater than 45 m$^2$/g.

25. Particulates of a calcined trivalent rare earth oxide, the rare earth oxide being selected from the group consisting of yttrium oxide, lanthanum oxide, praseodymium oxide, neodymium oxide, samarium oxide, europium oxide, gadolinium oxide, terbium oxide, dysprosium oxide, holmium oxide, erbium oxide, lutecium oxide and thulium oxide, the rare earth oxide having a specific surface ranging from 70 to 110 m$^2$/g, measured after calcination for at least two hours at a temperature of from 400° to 450° C., a pore volume of at least 0.2 cm$^3$/g, and a mean pore diameter of greater than 50 Å.

26. Particulates consisting of a calcined trivalent rare earth oxide, the rare earth oxide being selected from the group consisting of yttrium oxide, lanthanum oxide, praseodymium oxide, neodymium oxide, samarium oxide, europium oxide, gadolinium oxide, terbium oxide, dysprosium oxide, holmium oxide, erbium oxide, lutecium oxide and thulium oxide, the rare earth oxide having a specific surface ranging from 70 to 100 m$^2$/g, measured after calcination for at least two hours at a temperature of from 400° to 450° C., a pore volume of at least 0.2 cm$^3$/g, and a mean pore diameter of greater than 50 Å.

* * * * *